US012404021B2

(12) United States Patent
Ramezani

(10) Patent No.: US 12,404,021 B2
(45) Date of Patent: Sep. 2, 2025

(54) ARMWING STRUCTURES FOR AERIAL ROBOTS

(71) Applicant: Northeastern University, Boston, MA (US)

(72) Inventor: Alireza Ramezani, Pawtucket, RI (US)

(73) Assignee: Northeastern University, Boston, MA (US)

(*) Notice: Subject to any disclaimer, the term of this patent is extended or adjusted under 35 U.S.C. 154(b) by 676 days.

(21) Appl. No.: 17/786,273

(22) PCT Filed: Jan. 15, 2021

(86) PCT No.: PCT/US2021/013655

§ 371 (c)(1),
(2) Date: Jun. 16, 2022

(87) PCT Pub. No.: WO2021/146569

PCT Pub. Date: Jul. 22, 2021

(65) Prior Publication Data

US 2022/0380038 A1 Dec. 1, 2022

Related U.S. Application Data

(60) Provisional application No. 62/961,385, filed on Jan. 15, 2020.

(51) Int. Cl.
*B64C 33/02* (2006.01)
*B64C 13/28* (2006.01)
(Continued)

(52) U.S. Cl.
CPC .............. *B64C 33/02* (2013.01); *B64C 13/28* (2013.01); *B64D 47/00* (2013.01); *B64U 10/40* (2023.01); *B64U 10/80* (2023.01)

(58) Field of Classification Search
CPC ......... B64C 33/02; B64C 13/28; B64D 47/00; B64U 10/80; B64U 10/40
See application file for complete search history.

(56) References Cited

U.S. PATENT DOCUMENTS 4,195,438 A * 4/1980 Dale .................... A63H 27/008 446/35
4,712,749 A * 12/1987 Fox ......................... B64C 33/02 244/22

(Continued)

FOREIGN PATENT DOCUMENTS

CN 105799932 B 11/2017
CN 111099016 A 5/2020

(Continued)

OTHER PUBLICATIONS

International Search Report and Written Opinion for International Application No. PCT/US2021/013655 dated Apr. 9, 2021.

(Continued)

*Primary Examiner* — Joshua J Michener
*Assistant Examiner* — Aaron M Rodziwicz
(74) *Attorney, Agent, or Firm* — Foley Hoag LLP; Dana M. Gordon; John D. Lanza

(57) ABSTRACT

Robotic wings for an aerial drone include a plurality of armwing structures, each comprising a plurality of rigid members connected together by flexible living hinges in a single monolithic structure. Wing membranes are supported by the armwing structures. A drive mechanism is connected to the armwing structures for articulating the armwing structures. A motor is connected to the drive mechanism for actuating the drive mechanism to move the armwing structures through a series of wingbeats wherein the armwing structures expand in a downstroke and retract in an upstroke to move the wing membranes in a flapping motion.

18 Claims, 15 Drawing Sheets

1

2

3

4

(51) Int. Cl.

| | |
|---|---|
| ***B64D 47/00*** | (2006.01) |
| ***B64U 10/40*** | (2023.01) |
| ***B64U 10/80*** | (2023.01) |

(56) References Cited

U.S. PATENT DOCUMENTS

| | | | | |
|---|---|---|---|---|
| 5,899,408 | A * | 5/1999 | Bowers, Jr. | B64C 33/02 244/22 |
| 6,082,671 | A * | 7/2000 | Michelson | B64U 10/40 249/11 |
| 6,227,483 | B1 * | 5/2001 | Therriault | B64C 33/02 440/93 |
| 6,550,716 | B1 * | 4/2003 | Kim | B64U 10/40 244/22 |
| 6,568,634 | B2 * | 5/2003 | Smith | B64C 33/02 244/22 |
| 6,659,397 | B1 * | 12/2003 | Charron | B64C 33/02 244/76 R |
| 6,769,949 | B2 * | 8/2004 | Kim | A63H 27/008 244/22 |
| 6,783,097 | B1 * | 8/2004 | Smith | B64C 33/02 244/22 |
| 6,802,473 | B2 * | 10/2004 | Charron | B64C 33/02 244/11 |
| 6,840,476 | B1 * | 1/2005 | Raney | B64U 10/80 244/22 |
| 6,938,853 | B2 * | 9/2005 | Pines | B64U 50/19 244/22 |
| 6,959,895 | B2 * | 11/2005 | Cylinder | B64C 39/08 244/22 |
| 7,204,455 | B2 * | 4/2007 | Sinclair | B64U 50/19 244/72 |
| 7,219,855 | B2 * | 5/2007 | Hamamoto | B64C 33/02 244/72 |
| 7,331,546 | B2 * | 2/2008 | Ifju | B64U 30/12 244/123.1 |
| 7,341,222 | B1 * | 3/2008 | Reuel | B64U 10/80 244/22 |
| 7,600,712 | B2 * | 10/2009 | Higham | A63H 27/008 244/22 |
| 7,607,610 | B1 * | 10/2009 | Sterchak | B64C 33/02 244/22 |
| 7,651,051 | B2 * | 1/2010 | Agrawal | B64C 33/02 244/22 |
| 8,700,233 | B1 * | 4/2014 | Doman | B64C 33/02 701/4 |
| 9,950,790 | B2 * | 4/2018 | Keennon | B64C 19/00 |
| 10,017,248 | B2 * | 7/2018 | Samuel | B64C 33/02 |
| 10,065,737 | B2 * | 9/2018 | Keennon | B64C 33/02 |
| 10,380,997 | B1 | 8/2019 | Ward et al. | |
| 11,814,169 | B2 * | 11/2023 | Fuller | H10N 30/2045 |
| 12,240,283 | B2 * | 3/2025 | Aukes | B64C 33/02 |
| 2005/0269447 | A1 * | 12/2005 | Chronister | B64C 33/02 244/72 |
| 2007/0210207 | A1 * | 9/2007 | Liao | B64U 30/10 244/22 |
| 2012/0248243 | A1 * | 10/2012 | Greenyer | B64U 10/80 310/317 |
| 2012/0292438 | A1 * | 11/2012 | Sreetharan | B64U 10/40 74/108 |
| 2017/0076196 | A1 | 3/2017 | Sainath et al. | |
| 2018/0082181 | A1 | 3/2018 | Brothers et al. | |
| 2019/0130272 | A1 | 5/2019 | Yosinski et al. | |
| 2021/0163129 | A1 * | 6/2021 | Thomas | B64C 33/02 |

FOREIGN PATENT DOCUMENTS

| | | | |
|---|---|---|---|
| WO | WO-2021/146569 | A1 | 7/2021 |
| WO | WO-2021/151056 | A1 | 7/2021 |

OTHER PUBLICATIONS

International Search Report and Written Opinion for International Application No. PCT/US2021/014866 mailed Apr. 12, 2021.

Mateti., "Flapping Wing Mechanisms for Pico Air Vehicles Using Piezoelectric Actuators," The Pennsylvania State University the Graduate School: 147 pages (2012).

Ramezani et al., "Mechanism Design of a Bio-inspired Armwing Mechanism for Mimicking Bat Flapping Gait," Biomechatronics Intelligent Robotics Lab, retrieved online <https://www.youtube.com/watch?v=IG4GORa4TKU>: 1 page (2020).

Zhang et al., "Systematic Weight Pruning of DNNS using alternating direction method of multipliers," Workshop Track—ICLR, (4 pages) (2018).

* cited by examiner

FIG. 1
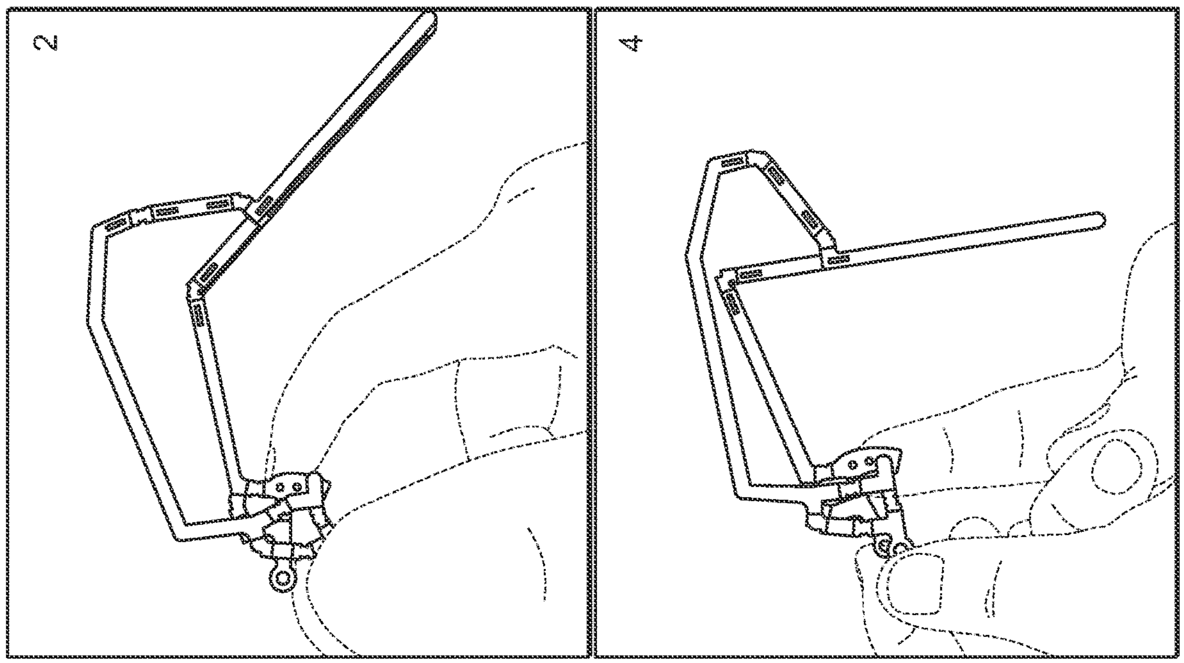
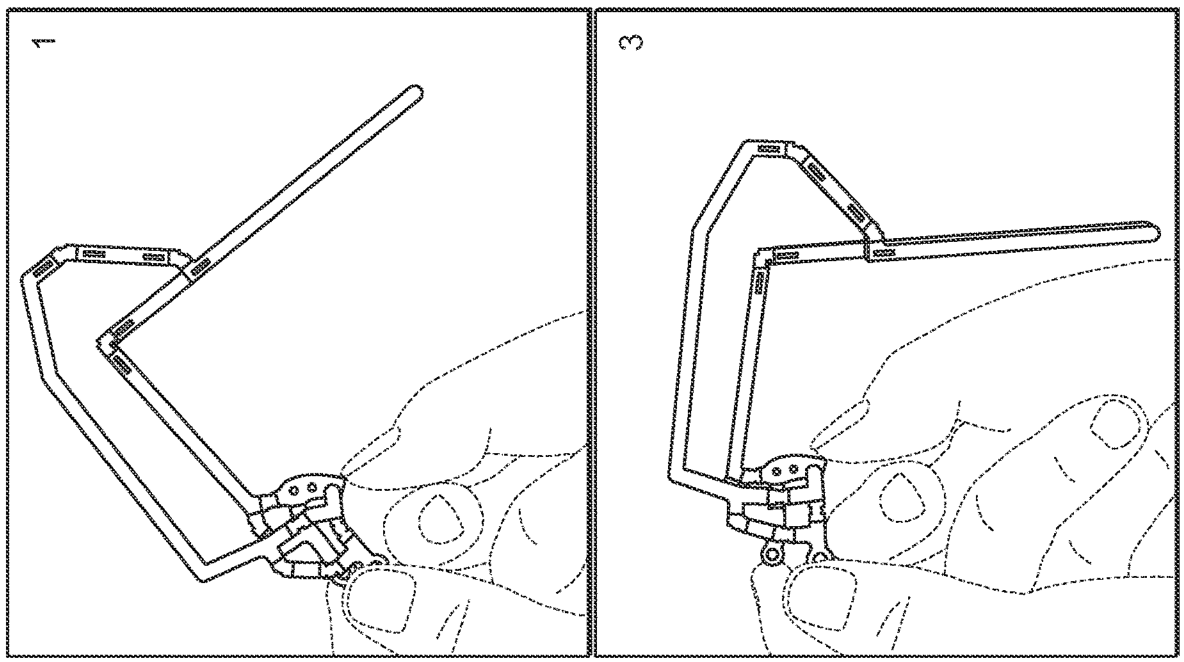

104
Front View
104
100
Side View

102
Rigid
Flexible
Living hinges
Flexible
Living hinges
100
104
102
Isometric
View Link 3
Link 5
Link 8
Link 10
Link 12
$l_{3a}$
$l_{3b}$
$l_{3c}$
$l_{5a}$
$l_{5b}$
$l_h$
$\alpha_5$
$l_{8a}$
$l_{8b}$
$l_{8c}$
$l_{10a}$
$l_{10b}$
$l_{10c}$
$l_{10d}$
$l_{12a}$
$l_{12b}$
$l_r$ (a) Unoptimized armwing angles.

(a) Optimized armwing angles and their target trajectories.

(a) Wing expansion before the downstroke.

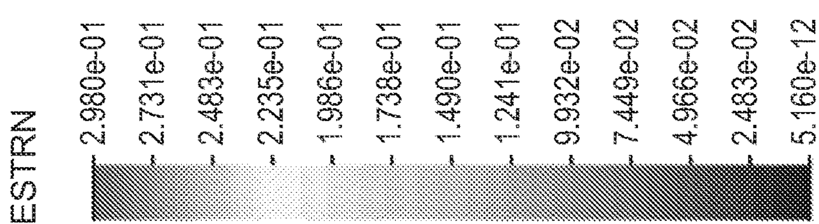
FIG. 6B
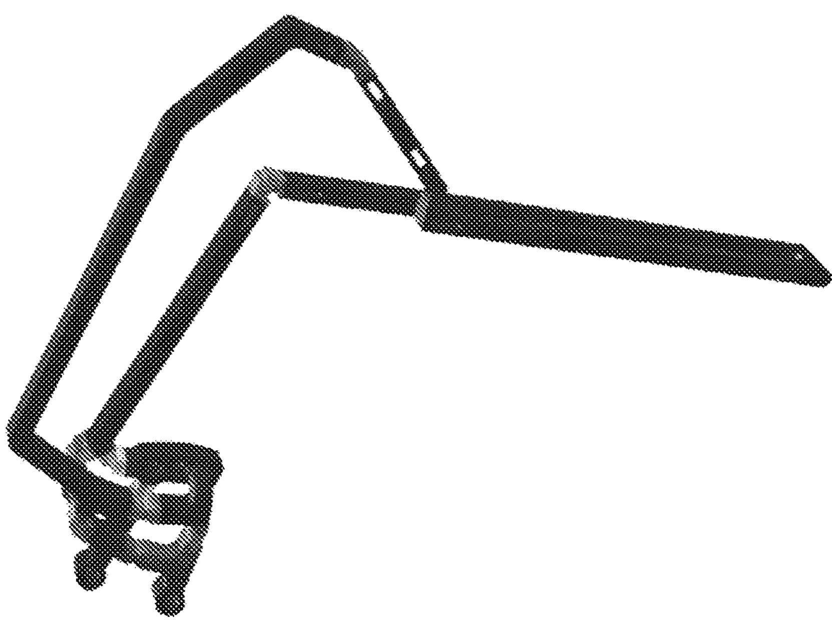
(b) Wing retraction before the upstroke.

(a) Adjustment to $l_1$ length.

(b) Adjustment to $l_4$ length.

(c) Adjustment to $l_g$ length.

TABLE I
TABLE OF THE TESTED HINGE MATERIALS

| Material | Shore Hardness (A) | Elongation at Break (%) |
|---|---|---|
| FLX 9850 | 50 - 55 | 170 - 210 |
| FLX 9870 | 60 - 70 | 120 - 140 |
| FLX 9885 | 80 - 85 | 70 - 90 |

FIG. 9

TABLE II
OPTIMIZED WING CONFORMATION DESIGN PARAMETERS ($\boldsymbol{q}$)

| Param. | Value | Param. | Value | Param. | Value |
|---|---|---|---|---|---|
| $l_1$ | 3.88 mm | $l_9$ | 9.01 mm | $p_{4y}$ | 2.90 mm |
| $l_2$ | 11.5 mm | $l_{10a}$ | 5.00 mm | $p_{7x}$ | 17.5 mm |
| $l_{3a}$ | 14.7 mm | $l_{10b}$ | 7.00 mm | $p_{7y}$ | 10.4 mm |
| $l_{3b}$ | 6.91 mm | $l_{10c}$ | 70.0 mm | $p_{9x}^*$ | 0 mm |
| $l_{3c}$ | 11.0 mm | $l_{10d}$ | 9.40 mm | $p_{9y}^*$ | $-15$ mm |
| $l_4$ | 9.46 mm | $l_{11}$ | 25.1 mm | $p_{12x}^*$ | $= l_{8a}$ |
| $l_{5a}$ | 3.35 mm | $l_{12a}$ | 30.0 mm | $p_{12y}$ | $-5.00$ mm |
| $l_{5b}$ | 4.56 mm | $l_{12b}$ | 9.98 mm | $p_{14x}$ | 15.8 mm |
| $l_6$ | 3.46 mm | $l_h^*$ | 50 mm | $p_{14y}$ | 4.68 mm |
| $l_7$ | 12.0 mm | $l_r^*$ | 90 mm | $\alpha_5$ | $31.0^\circ$ |
| $l_{8a}$ | 10.0 mm | $p_{1x}^*$ | 0 mm | $\phi_0$ | $1^\circ$ |
| $l_{8b}$ | 7.00 mm | $p_{1y}^*$ | 15 mm | $\Delta\phi$ | $18.2^\circ$ |
| $l_{8c}$ | 10.00 mm | $p_{4x}^*$ | $= l_{3a}$ | | |

Note: parameters with superscript * has a constrained value.

TABLE III

SENSITIVITY ANALYSIS OF THE WING MECHANISM PARAMETERS

| ***q*** | $A_s$ | $A_e$ | $M_s$ | $M_e$ | $\Delta\theta$ |
|---|---|---|---|---|---|
| $l_1$ | **19.7** | **47.7** | -1.40 | -3.47 | **18.6** |
| $l_2$ | -2.79 | 2.48 | 9.86 | -28.6 | -4.71 |
| $l_{3a}$ | -2.94 | -17.7 | -10.2 | 30.9 | -1.23 |
| $l_{3b}$ | -1.51 | 8.85 | 11.1 | **-30.97** | -5.21 |
| $l_{3c}$ | 1.87 | 2.93 | -2.06 | 5.74 | 0 |
| $l_4$ | 1.83 | -8.14 | **-11.3** | 31.6 | 3.81 |
| $l_{5a}$ | -5.49 | -19.8 | -6.83 | 22.5 | -5.37 |
| $l_{5b}$ | -7.47 | -6.59 | 7.79 | -21.5 | -7.89 |
| $\alpha_5$ | 0 | 68.5 | 57.3 | -163 | 0 |
| $p_{4y}$ | -6.96 | -6.22 | 8.56 | -21.4226 | -12.4 |
| $p_{7x}$ | -2.36 | 7.40 | 11.0 | -30.3708 | -6.19 |
| $p_{7y}$ | 4.22 | 11.3 | 1.28 | -9.05 | 5.18 |
| $\phi_0$ | $-2.2 \cdot 10^{-4}$ | $-2.3 \cdot 10^{-4}$ | $-4.3 \cdot 10^{-4}$ | $-2.5 \cdot 10^{-4}$ | 0 |
| $l_6$ | 0 | **-23.7** | 0 | 14.2 | **-20.8** |
| $l_7$ | 0 | 8.69 | 0 | **-24.9** | 1.5 |

FIG. 11 (cont.)

| | | | | | |
|---|---|---|---|---|---|
| $l_{8a}$ | 0 | 12.3 | 0 | -15.0 | 5.4 |
| $l_{8b}$ | 0 | -9.5 | 0 | 15.0 | -5.14 |
| $l_{8c}$ | 0 | -1.14 | 0 | -14.0 | -5.4 |
| $l_{9}$ | 0 | 6.07 | 0 | -20.9 | -2.0 |
| $l_{10a}$ | 0 | 10.8 | 0 | -16.5 | 7.2 |
| $l_{10b}$ | 0 | 4.36 | 0 | 11.7 | 7.71 |
| $l_{10c}$ | 0 | -2.37 | 0 | 0.045 | 0.514 |
| $l_{10d}$ | 0 | -1.08 | 0 | 2.5 | 0 |
| $l_{11}$ | 0 | 1.01 | 0 | -2.77 | 0 |
| $l_{12a}$ | 0 | -1.3 | 0 | 2.51 | 0 |
| $l_{12b}$ | 0 | -0.434 | 0 | -1.08 | 0 |
| $p_{12y}$ | 0 | -6.09 | 0 | 10.6 | -3.6 |
| $p_{14x}$ | 0 | -6.51 | 0 | 15.5 | 2.28 |
| $p_{14y}$ | 0 | -4.28 | 0 | 16.3 | 0 |
| $\Delta\phi$ | 0 | 117.0 | 0 | 12.1 | 0 |

Note: units are rad/mm for length or position and rad/rad for angles.

ARMWING STRUCTURES FOR AERIAL ROBOTS

CROSS REFERENCE TO RELATED APPLICATION APPLICATIONS

This application is a national phase entry under 35 USC § 371 of International Application No. PCT/US21/13655 filed Jan. 15, 2021, entitled ARMWING STRUCTURES FOR AERIAL ROBOTS, which claims priority from U.S. Provisional Patent Application No. 62/961,385 filed on Jan. 15, 2020, entitled Bat-Inspired Landing Gear For Aerial Drones. The entire contents of these applications are incorporated herein by reference in their entirety.

BACKGROUND

The present application relates generally to aerial robots that are soft, agile, collision-tolerant, and energetically efficient by the biomimicry of key airborne vertebrate flight characteristics.

In recent years, much attention has been drawn to make residential and work spaces smarter and to materialize the concept of smart cities [1]. As a result, safety and security aspects are gaining ever growing importance [2] and drive a lucrative market. Systems that can provide situational awareness to humans in residential and work spaces or contribute to dynamic traffic control in cities will result in large-scale intelligent systems with enormous societal impact and economic benefit.

Current state-of-the-art solutions with rotary or fixed-wing features fall short in addressing the challenges and can pose extreme dangers to humans. Fixed or rotary-wing systems are widely applied for surveillance and reconnaissance, and there is a growing interest to add suites of on-board sensors to these unmanned aerial systems (UAS) and use their aerial mobility to monitor and detect hazardous situations in residential spaces. While, these systems, e.g., quadrotors, can demonstrate agile maneuvers and have demonstrated impressive fault-tolerance in aggressive environments, quadrotors and other rotorcrafts require a safe and collision-free task space for operation since they are not collision-tolerant due to their rigid body structures. The incorporation of soft and flexible materials into the design of such systems has become common in recent years; yet, the demands for aerodynamic efficiency prohibit the use of rotor blades or propellers made of extremely flexible materials.

The flight apparatus of birds and bats can offer invaluable insights into novel micro-aerial vehicle (MAV) designs that can safely operate within residential spaces. The pronounced body articulation (morphing ability) of these flyers is key to their unparalleled capabilities. These animals can reduce the wing area during upstrokes and can extend it during downstrokes to maximize positive lift generation [3]. It is known that some species of bats can use differential inertial forces to perform agile zero-angular momentum turns [4]. Biological studies suggest that the articulated musculoskeletal system of animals can absorb impact forces therefore can enhance their survivability in the event of a collision [5].

Various embodiments disclosed herein relate to a bio-inspired soft and articulated armwing structure as an integral component of a morphing aerial robot. In our design, we draw inspiration from bats. Bat membranous wings possess unique functions [6] that make them a good example to take inspiration from and transform current aerial drones. In contrast with other flying vertebrates, bats have an extremely articulated musculoskeletal system, key to their body impact-survivability and deliver an impressively adaptive and multimodal locomotion behavior [7]. Bats exclusively use this capability with structural flexibility to generate the controlled force distribution on each wing membrane. The wing flexibility, complex wing kinematics, and fast muscle actuation allow these creatures to change the body configuration within a few tens of milliseconds. These characteristics are crucial to the unrivaled agility of bats [8] and copying them can potentially transform the state-of-the-art aerial drone design.

An untethered, self-sustained, and autonomous robotic platform that can mimic bird and bat explosive wing articulations is a significant design problem after noting the prohibitive design restrictions such as payload, size, power, etc. MAVs with a morphing body [9]—[11] have distinguished themselves from other archetypal MAVs through their superior performance. However, unlike a wide variety of conventional flapping wing robots that have been developed in various sizes, ranging from insect-style flapping MAVs [12] to larger bird-style robots [13]—[16], these morphing designs are not well explored.

The wings of flapping MAVs are commonly made of a single wing segment and are articulated to either flapping about a constant axis of rotation [17], [18], or about a rotating axis which has the effect of adjusting the wing's angle of attack [19], [20]. In these designs, wing folding is overlooked. The supination-pronation motion that allows the wing to produce lift during upstrokes is achieved either passively or to a limited degree not comparable to its biological counterparts.

The importance of wing folding in animal flight has motivated recent designs [20]. However, the prohibitive design challenges have set limits in copying the pronounced mediolateral or flexion-extension movements found in animals flight apparatus. SmartBird [20] wings have two wing segments and they bend at the elbow joint to expand and retract the wings during down-strokes and upstrokes, respectively. These movements maximize the positive lift generation.

Other works [21]—[24] attempted to design armwing retraction mechanisms and used the opportunity to study the underlying control mechanisms [25]-[29] based on which bats perform sharp banking turns and diving maneuvers. The morphing wing design introduced by [23] considered substantially fewer joints in an untethered system by erecting a kinetic sculpture that embodied several biologically meaningful modes from bats. Contrary to [23], many string-and-pulley-activated joints were incorporated in the morphing wings introduced by [30] and [31] that allowed a greater control authority over independent joint movements. However, these designs were tethered.

All of these morphing wings have achieved great success in copying kinematics and dimensional complexity of bat flight apparatus. However, the armwing mechanisms present in these robots were not capable of copying the dynamically versatile wing conformations found in bats.

The emerging ideas surrounding achieving computation in robots through sophisticated interactions of morphology, however, has begun to change motion design and control in robots that have prohibitive design restrictions. Such a computation, called morphological computation or mechanical intelligence [32], draws our attention to the fact that there is a common interconnection—and in some morphologies these couplings are very tight—between the boundaries of morphology and closed-loop feedback.

Controllers lie in the space of abstract computation, and are usually implemented in computational layers or are programmed into the system. However, if mechanical interactions can also perform computation, it becomes possible for the morphology to play a role of computation in the system, and in effect part of the role of the controller is subsumed under computational morphology. As a result, a cleverly designed structure can facilitate control requirements by performing part of the computation. These natural and biologically motivated computational structures can be very favorable in morphing MAV design and have been overlooked because of sophistication associated with design and fabrication. Particularly, we will explore such design approaches to copy dynamically versatile wing conformations of bats flight apparatus.

BRIEF SUMMARY OF THE DISCLOSURE

In accordance with one or more embodiments, robotic wings are disclosed for an aerial drone include a plurality of armwing structures, each comprising a plurality of rigid members connected together by flexible living hinges in a single monolithic structure. Wing membranes are supported by the armwing structures. A drive mechanism is connected to the armwing structures for articulating the armwing structures. A motor is connected to the drive mechanism for actuating the drive mechanism to move the armwing structures through a series of wingbeats wherein the armwing structures expand in a downstroke and retract in an upstroke to move the wing membranes in a flapping motion.

In accordance with one or more further embodiments armwing structures are disclosed for an aerial robot, each comprising a plurality of rigid members connected together by flexible living hinges in a single monolithic structure. Each armwing structure is configured to support a wing membrane. Each armwing structure is configured to be articulated by a drive mechanism driven by a motor such that the armwing structures are moved through a series of wingbeats during which the armwing structures expand in a downstroke and retract in an upstroke to move the wing membranes in a flapping motion.

BRIEF DESCRIPTION OF THE DRAWINGS

FIG. 1 is a set of time-lapsed images showing articulation of an exemplary armwing structure for an aerial robot in accordance with one or more embodiments.

FIGS. 6A and 6B show finite element analysis of the compliant mechanism under static torques acting on the crank arms. The strain values are shown at the right side of the charts.

FIGS. 9, 10, and 11 contain Tables I, II, and III, respectively.

DETAILED DESCRIPTION

Various embodiments disclosed herein extend our prior contributions [21]—[24] by offering kinetic sculpture designs that can capture bat dynamically versatile wing conformations. The disclosed structures comprise rigid and flexible materials that are monolithically fabricated using novel computer-aided fabrication methods and additive manufacturing technology (e.g., PolyJet 3D printing). Like its predecessor, this armwing structure articulation is also designed to expand and retract within a single wingbeat through a series of crank and four-bar mechanisms as it is actuated by a single brushless DC motor. The use of a monolithic rigid and flexible armwing structure in a flying robot is novel and impactful for flapping robot design as this structure is capable of mimicking the range of motion and flexibility of an actual bat armwing. This mechanism design assumes a planar flapping motion and only articulates the wing plunging and extension-retraction gaits. Other modes such as supination-pronation, sweeping motion, and 3D flapping gait are also possible.

Figures 2A, 2B, 2C:
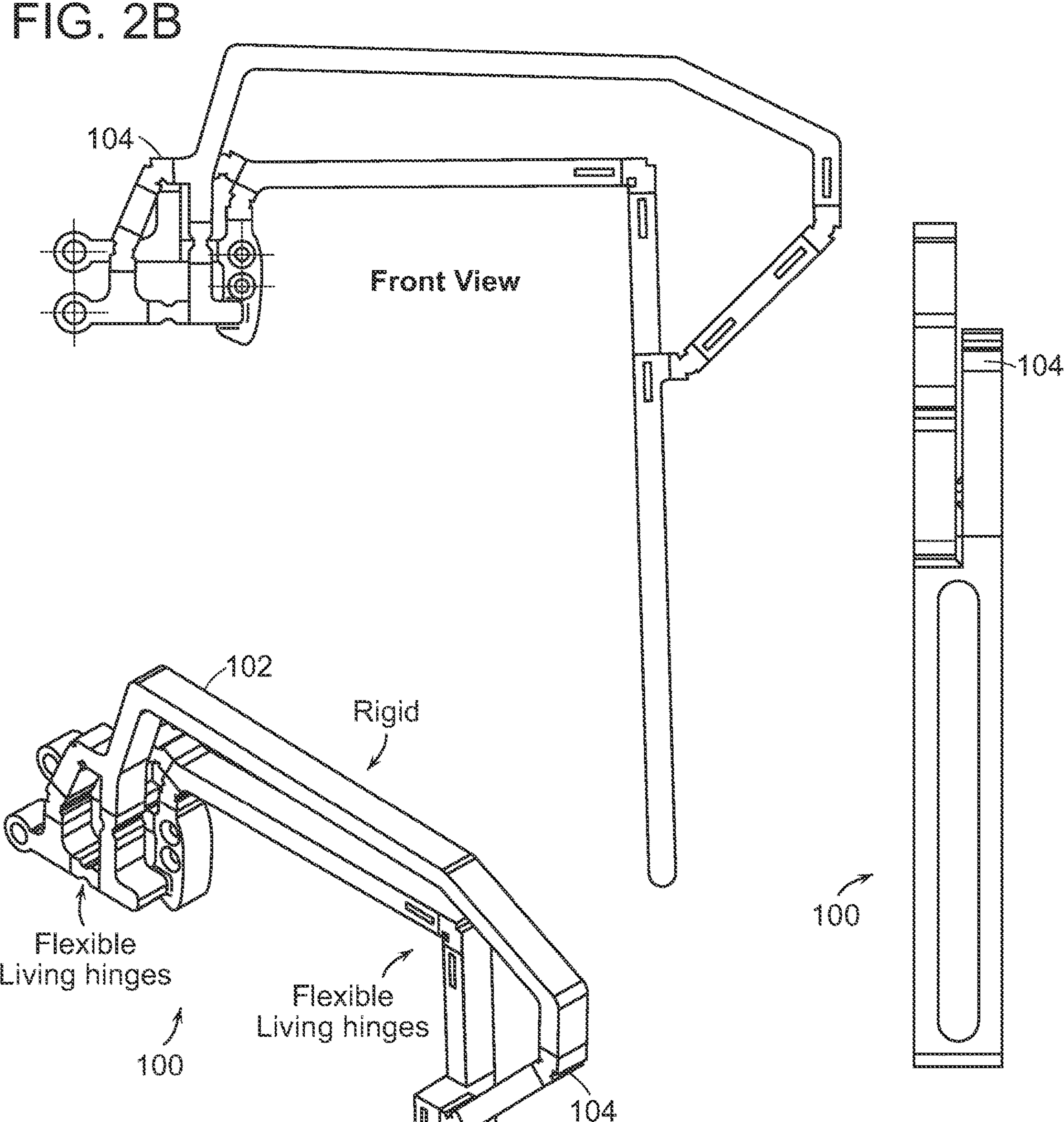
FIGS. 2A, 2B, and 2C show perspective, front, and side views of the armwing structure in accordance with one or more embodiments.

Various embodiments disclosed herein relate to an aerial robot having a novel bio-inspired monolithic bat armwing structure with both flexible and rigid materials. The armwing structure is designed to expand and retract during the wing flapping motion to maximize the net lift produced by the wings. FIGS. 2A, 2B, and 2C show perspective, front, and side views of an exemplary armwing structure 100 in accordance with one or more embodiments. The armwing structure 100 comprises a plurality of rigid members 102 connected together by flexible living hinges 104 in a single monolithic structure.

FIG. 1 is a set of time-lapsed images showing articulation of the armwing structure in accordance with one or more embodiments. The first two images (1 and 2) show the wing downstroke/expansion motion, while the second two images (3 and 4) show the wing upstroke/retraction motion.

The following set of design criteria can be used in developing a robotic wing structure that can mimic the speed and flexibility of a natural bat wing: (a) a mechanical structure that mimics as many meaningful degrees-of-freedom (DoF) as possible from the natural bat wing, (b) a robust and flexible wing structure that facilitates control through morphological computation, and (c) a small, lightweight, and compact mechanism. Meaningful DoFs include the plunging motion along with the wing extension/retraction, where the control is facilitated by either changing the wing morphology or by directly articulating the armwing kinetic sculpture.

A bat wing has up to 34 DoF and unparalleled flexibility [30], which is not feasible to replicate using a rigid mechanical structure in a small and compact form factor. By using flexible joints to form a compliant structure, we can mimic some of the natural bat wing's flexibility and the important DoFs for flapping flight packaged in a very compact mechanical structure. The multi-material printing capability of PolyJet 3D printers allows us to fabricate a monolithic wing structure composed of rigid and flexible materials, which is shown in FIG. 2.

The wing structure is articulated using a series of cranks and four-bar linkage mechanisms as shown in FIG. 3. This mechanism is preferably actuated with only a single motor, therefore the wing expansion/retraction is a slave to the flapping motion as it is actively actuated by the motor. In one exemplary embodiment, in order to achieve a small and lightweight structure, we constrain our design such that the driving mechanism is contained in a capsule-shaped tube of 50 mm diameter and 75 mm long. The total wingspan of the robot is approximately 300 mm wide which follows a similar form factor as our previous work [23], and we aim for a robot that weighs approximately 20 grams.

Flexible Hinge Design

The flexible joints are part of the wing's compliant mechanism. Several design considerations affect the hinge stiffness and robustness. There are several design variations for a compliant joint as outlined in [33], where they vary in size, off-axis stiffness, axis drift, stress concentration, and range of motion. In order to satisfy our design target of a small and lightweight aerial robot, we choose to use the simple planar notch design as shown in FIG. 2. This notch design has a disadvantage in the form of very low off-axis stiffness, particularly the torsional stiffness. The PolyJet flexible materials, in the case of Stratasys PolyJet 3D printers, come in Shore hardness scale range of 30 A to 85 A, which is formed by mixing the rigid Vero White and the flexible Agilus Black [34]. A softer and more flexible material has better compliance, which means that it can safely deform to counteract unexpected forces. However, it will also has worse resistance to torsion and off-axis perturbations.

The planar four-bar linkage mechanism shown in FIGS. 2A-2C assumes that the structure does not deform in the off-plane directions, so the low off-axis stiffness can be a significant issue. This problem can be addressed by using a larger cross-sectional area or by reinforcing the hinge with a flexible support structure post-fabrication to increase the off-axis stiffness of the hinge. The larger cross-sectional area increases the durability of the hinge, but also increase the overall hinge stiffness and weight which is a design trade-off.

One exemplary embodiment includes a combination of 1.3 mm and 2 mm hinge thickness with the flexible materials as shown in Table I (FIG. 9), where the material property values are taken from [34]. We use a shaft thickness of 3 mm and depth of 5 mm in the disclosed link designs. The deep shaft design increases the off-axis stiffness of the armwing structure and the durability of the hinge. The three material hardness in Table I capture a wide range of stiffness, which can be a reference point for other design iterations. Each armwing prototypes we fabricated has the same hinge thickness and material within an individual wing. Conversely, it is possible to use varying hinge design and properties depending on each joint's stress and flexibility requirements which we can investigate in our future work.

Driving Mechanism Design

Figure 3A:
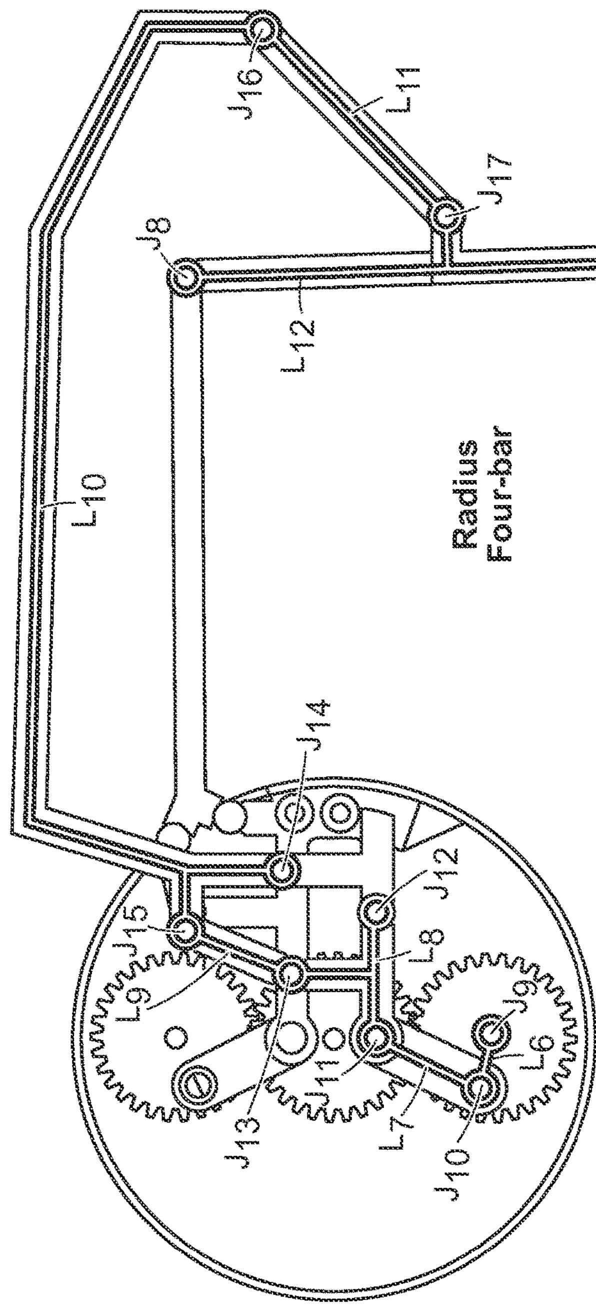
FIGS. 3A and 3B show a set of links and hinges in an exemplary wing linkage mechanism in accordance with one or more embodiments.
Figure 3B:
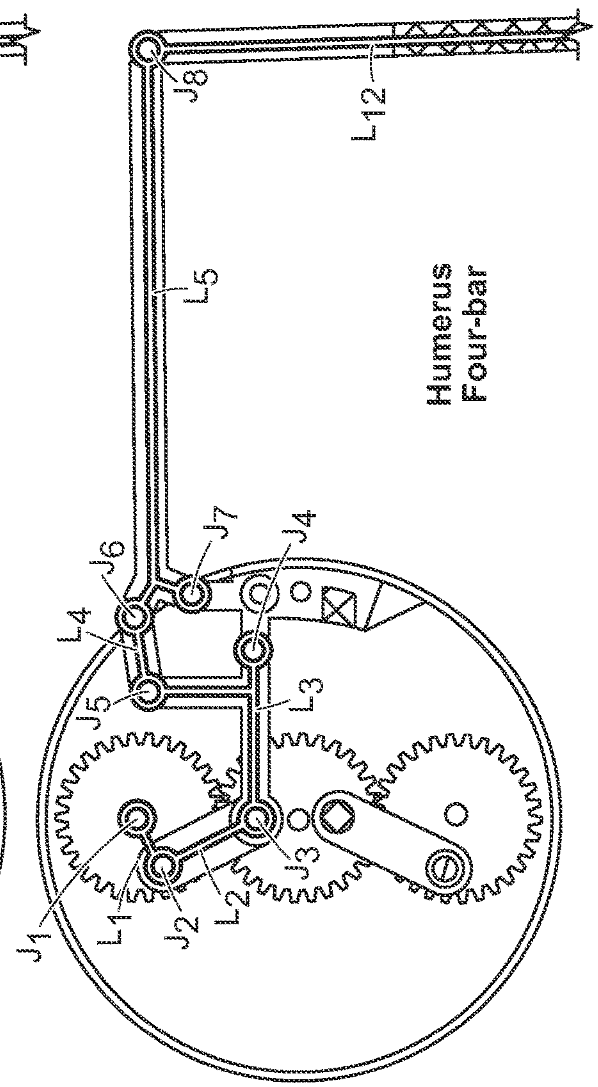

The armwing driving mechanism can be separated into two sets of crank and four-bar mechanisms, as shown in FIGS. 3A and 3B, where they articulate the linkages representing the radius and the humerus bones, respectively, in a bat's arm.

As shown in FIGS. 3A-3B, the wing linkage mechanism comprises 12 links ($L_i$, $i \in \{1, \ldots, 12\}$) and 17 joints/living hinges ($J_k$, $k \in \{1, \ldots, 17\}$). The crank mechanisms' drive links $L_3$ and $L_8$ actuate the shoulder and elbow joints $J_7$ and $J_8$, respectively.

Both crank mechanisms operate at the same frequency but with a different phase $\Delta\phi$, which articulates the desired wing extension and retraction during a specific timing within a wingbeat. The monolithic wing structure has 8 links and 11 hinges per wing while the gears and crank mechanism add 4 links and 6 revolute joints per wing, which results in a grand total of 12 links and 17 joints per wing. The mechanism is designed by assuming that the flexible hinges act like an ideal axial joint that follows the parallel linkage mechanism design principles.

In the exemplary embodiment, the humerus and radius links have a length of 50 mm and 90 mm, respectively, which is based on the conformation of the *Rousettus aegyptiacus* [35]. This bat flies under a flapping rate of approximately 10 Hz, which we emulate. Due to space constraints, the four-bar mechanisms are placed off-plane and parallel from each other. The gears that drive the four-bar mechanisms are placed in the midpoint of the body so that we can implement a symmetric wing assembly. This way, each side of the wing can utilize the same wing structure and the mechanisms can be connected using a spur gear or other means of power transmission. This configuration results in a horizontally-symmetric but off-plane wing skeletal structure. However, this is not problematic because the wing membranes can be attached in a symmetric fashion.

Monolithically Fabricated Bat Armwing Structure

The 3D printed monolithic bat armwing structure, which in the exemplary embodiment, weighs 7 grams, can be seen in FIG. 1 as it is being articulated from the crank arms. This flexible armwing conformation is capable of achieving the desired wing expansion and retraction. We tested several combinations of hinge thickness and materials as listed in Table I. As expected, there is a large variation in the stiffness and ease of articulation for each wing variant. We found out that an armwing with durometer scale of 50 A is simply too soft to be used in the wing articulation and it has very little off-plane and torsional stiffness even in the thicker hinge design. An armwing with the durometer scale of 85 A and 2 mm hinge thickness is too stiff and relatively brittle. However, a wing with 85 A durometer and 1.3 mm hinge thickness has excellent off-plane and torsional stiffness, which can be beneficial as long as we can provide the torque to actuate the stiff armwing. In the end, we conclude that the wings with 1.3 mm hinge thickness and either 70 A or 85 A durometer have the best overall result in the wing articulation and stiffness.

The mechanism shown in FIGS. 3A-3B was developed by simulating the rigid body linkages in Solidworks Motion Study. This methodology is suffice to discover the initial configuration that works well. However, in order to get the best result, a design optimization framework can be used to search for the best armwing conformation that follows the desired wing gait we specified.

Figure 8:
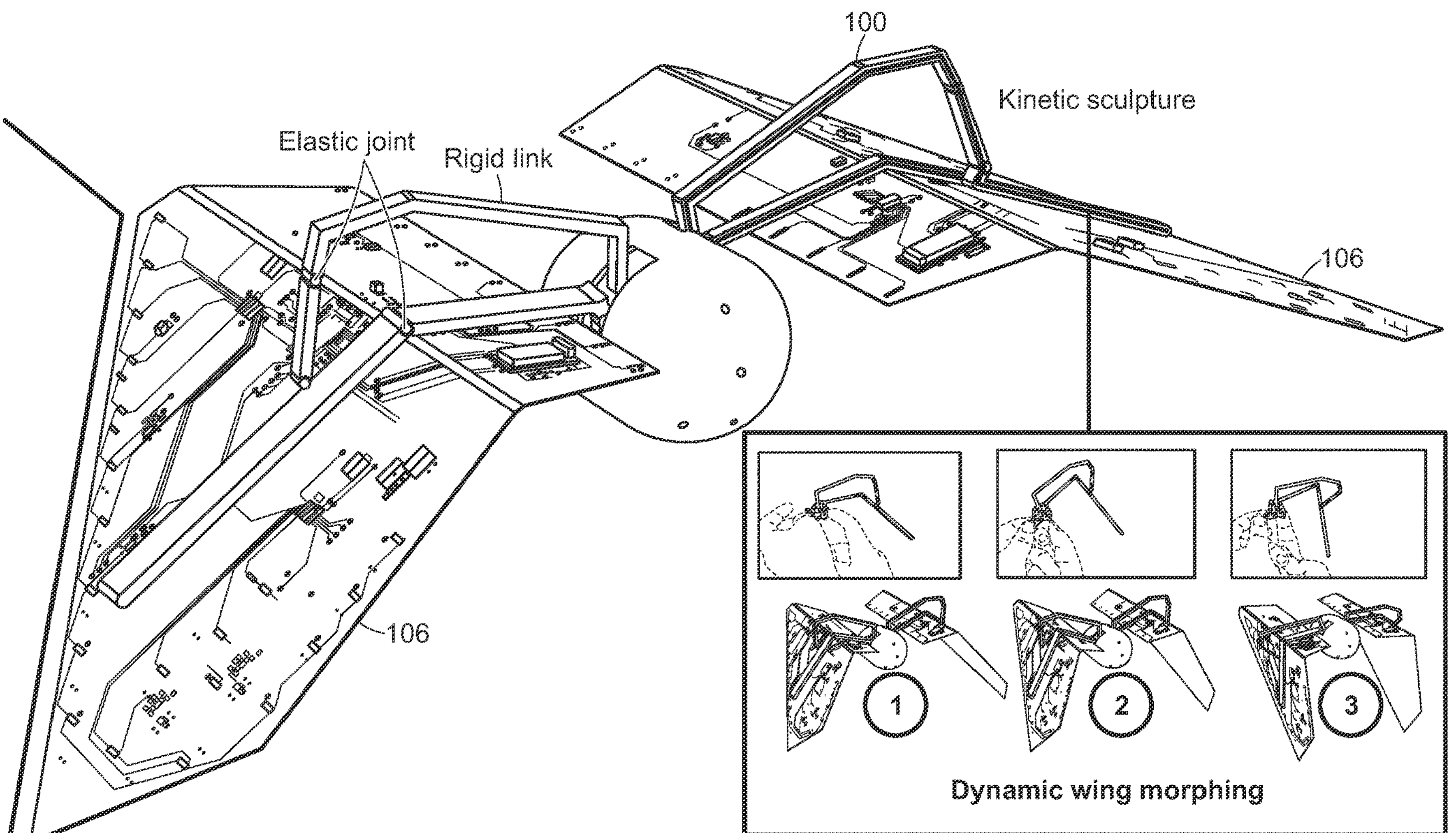
FIG. 8 illustrates exemplary wing membranes connected to the armwing structure in accordance with one or more embodiments.

FIG. 8 illustrates exemplary wing membranes 106 connected to the armwing structures 100 in accordance with one or more embodiments. In this exemplary embodiment, the wing membranes 106 each comprise a flexible printed circuit board (PCB). The PCB includes processing units and sensors. The sensors can be used for various purposes including, e.g., for flow measurement and wing movement measurement.

Wing Conformation Design Optimization

The wing mechanism is composed of rigid links and flexible hinges that can be modeled as rigid body linkages with linear and rotational stiffness at the joints, as outlined in [36]. However, fully modeling the flexible joints is very difficult considering the complexity of our design. Therefore, we designed the mechanism and performed our analysis assuming a rigid parallel linkage mechanism. The following outlines the rigid body kinematic formulation and the wing morphology optimization problem to follow a specific flapping trajectory.

Kinematic Formulation

Assuming rigid body kinematics, the armwing mechanism has two DoF per wing, which are represented by the two crank arms of the wing (links $L_3$ and $L_8$). Since the crank gears are coupled, the assembled wing mechanism only has one DoF, which means that the full system states can be solved from the driving gear angle if the value is known.

Figure 4:
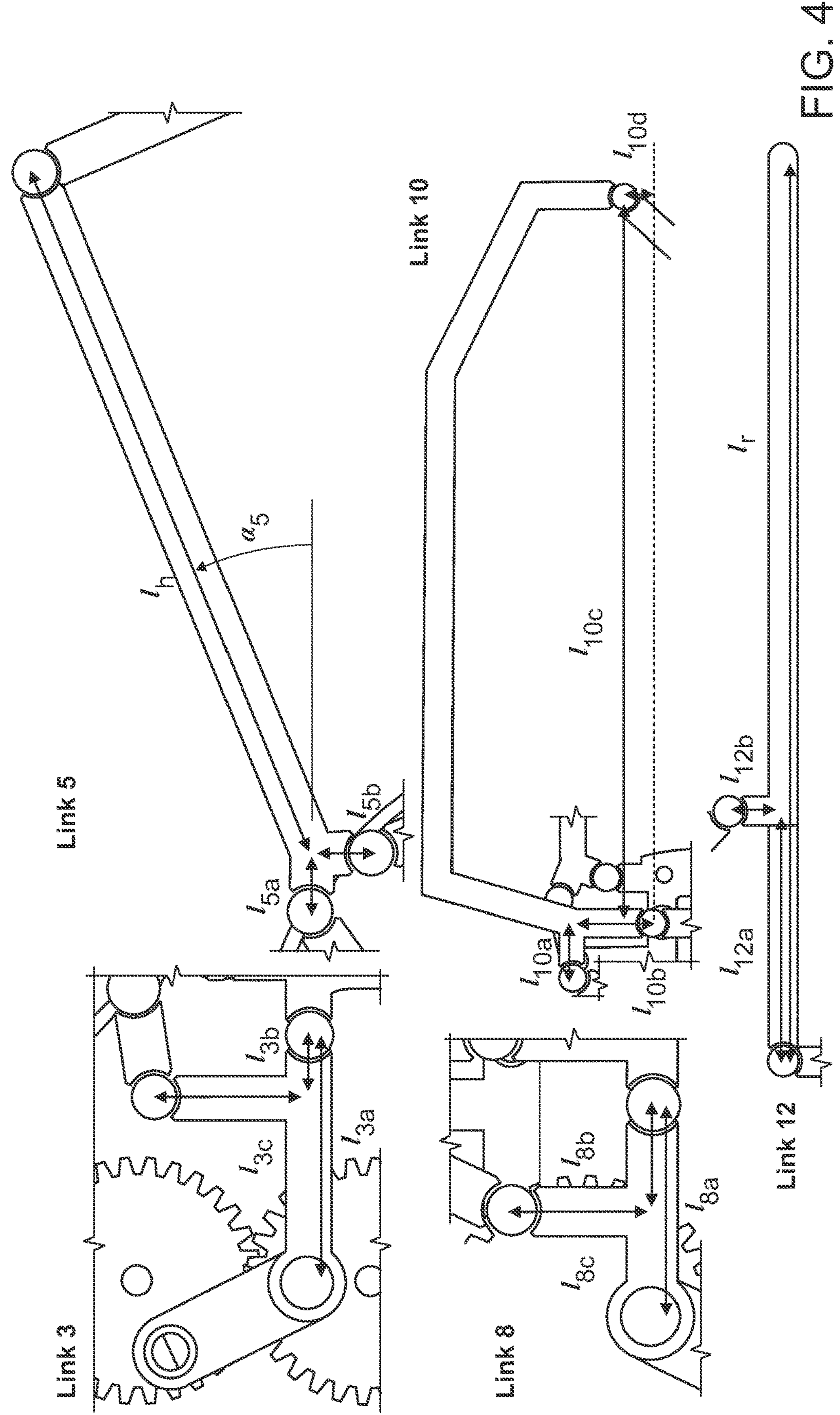
FIG. 4 shows the dimension parameters for non-straight links of the exemplary wing linkage mechanism in accordance with one or more embodiments.

Referring to FIGS. 3A-3B, let $\theta_i$ be the angle of joint i with respect to the horizontal axis and $p_i=[p_{ix}, p_{iy}]^T$ be the position of joint i. Table II (FIG. 10) lists the wing design parameters (q), where lj represents the length components of link Lj. The dimension parameters for non-straight links are shown in FIG. 4. The actuation phase difference $\Delta\phi$ defines the relation between two crank gear angles $\theta_1=\omega t+\phi_0$ and $\theta_9=\theta_1+\Delta\phi$, where $\omega$ is the flapping frequency.

Given the humerus mechanism driving gear angle $\theta_1$, the system states can be solved sequentially as follows:

(1) Solve the humerus mechanism: Given $\theta_1$, solve the four-bar linkages ($J_1$, $J_2$, $J_3$, $J_4$) for $p_5(\theta_4)$, then solve the next four-bar linkages ($J_4$, $J_5$, $J_6$, $J_7$) for $p_8(\theta_7)$.

(2) Solve the radius mechanism: Calculate $\theta_9=\theta_1+\Delta\phi$, then solve for the four-bar linkages ($J_9$, $J_{10}$, $J_{11}$, $J_{12}$) for $p_{13}(\theta_{12})$, then solve the next four-bar linkages ($J_{12}$, $J_{13}$, $J_{15}$, $J_{14}$) for $p_{16}(\theta_{14})$. Finally, solve the last three-bar linkage ($J_8$, $J_{16}$, $J_{17}$) for $p_{17}(\theta_8)$.

The four-bar and three-bar linkages listed above can be solved by using a root-finding algorithm. For example, given $\theta_1$, the solution to the four-bar linkages ($J_1$, $J_2$, $J_3$, $J_4$) can be found by solving the constraint equation $$h_c(\theta_4) = |p_2(\theta_1) - p_3(\theta_4)| - l_2 = 0 \tag{1}$$

$$p_2(\theta_1) = l_1\begin{bmatrix}\cos(\theta_1)\\ \sin(\theta_1)\end{bmatrix},\ p_3(\theta_4) = -l_{3a}\begin{bmatrix}\cos(\theta_4)\\ \sin(\theta_4)\end{bmatrix},$$

for $\theta_4$ which can be used to calculate $p_5(\theta_4)$. The remaining linkages can be solved in a similar fashion.

The angles that are biologically meaningful in this wing articulation are the shoulder and elbow angles, θs and θe, respectively, where θs represents the upstroke/downstroke motion and θe represents the retraction/expansion motion. We can then formulate a solver equation such that given the wing design parameters and the drive gear angle $\theta_1\in[0, 2\pi]+\phi_0$, solve for θs and θe.

$$\theta_s=\theta_7+\alpha_5,\ \theta_e=\theta_8-\theta_s+\pi$$

$$\theta_s,\theta_e^T=f_m(q,\theta_1). \tag{2}$$

Note that the solution of θe depends on θs but not the other way around.

The ideal desired flapping motion includes the following properties: (1) the wing extends and retracts during downstroke and upstroke, respectively, (2) the wing is already partially expanded before the downstroke motion begins. The desired trajectories $\hat{\theta}$s and $\hat{\theta}$e can be seen in FIG. 5B, which are defined as the following sinusoidal functions $$\hat{\theta}_s = 35°\sin(\phi) - 10° \tag{3}$$

-continued $$\hat{\theta}_e = -0.5\tan^{-1}\left(\frac{-0.5\sin(\phi+2\pi/3)}{1+0.5\cos(\phi+2\pi/3)}\right)45° + 120°,$$

where $\phi\in[0, 2\pi)$. θe is a skewed sinusoidal function which allows the wing to expands faster than the retraction and have a full wingspan in the middle of the downstroke.

The design optimization will solve for some of the mechanism design parameters q which is listed in Table II, using our initial mechanism design in Solidworks for the initial q. There are 38 parameters in the design space of this armwing and we constrain some of these parameters to fit our design criterion and reduce the search space of the optimizer. In order to have a symmetric gait between the left and right wing, the drive gears are centered ($p_{1x}=p_{9x}=0$) and the crank arm maximum horizontal length must be aligned with the body y axis ($p_{4x}=I_{3a}$, $p_{12x}=I_{8a}$). Additionally, we fix the values for the following parameters: $p_{1y}$=15 mm, $p_{9y}$=−15 mm, $I_h$=50 mm, and $I_r$=90 mm. This leaves us with 30 design parameters to optimize.

Considering the large design space of this wing structure, solving for all 30 parameters at the same time is not practical due to the large computational time and search space. The radius mechanism follows a trajectory in relation to the humerus mechanism to articulate the appropriate elbow angle. Therefore, we can separately optimize the humerus and radius mechanisms, starting from the humerus mechanism. The humerus and radius mechanisms have 13 and 17 design parameters, respectively.

The optimization problem can be formulated as $$\min_q (y^T y)/N \tag{4}$$

$$\text{subject to: } q_{min} \le q \le q_{max},\quad f_c \le 0,$$

where the cost function is the mean squared value of y, which is the difference between target vs. the simulated trajectory, N is the data size, q is the parameter to optimize, $q_{min}$ and $q_{max}$ are the parameter bounds, and $f_c$ is the constraint function. We used the interior-point method as the optimization algorithm in Matlab which has successfully found a solution that matches the target trajectory well.

1) Humerus Mechanism Optimization: The humerus mechanism is optimized using the cost function y=$\hat{\theta}$s−θs where θs is the trajectory vector gained by solving (2) for θs,k given the input angle $\theta_{1,k}=2\pi k/N+\phi_0$, k={1, . . . , N}. We then optimize the following 13 parameters $$q_H=[l_1,l_2,l_{3a},l_{3b},l_{3c},l_4,l_{5a},l_{5b},\alpha_5,p_{4y},p_{7x},p_{7y},\phi_0], \tag{5}$$

subject to the following constraints: (1) the body-fixed joint positions ($p_4$ and $p_7$) are within the robot's 50 mm diameter cylindrical body, (2) the linkages do not intersect or block each other, and (3) the length constraints for the linkages to prevent singularity in the four-bar mechanism. For example, the constraint equation $(l_1+|p_4-p_1|)-0.8\ (l_2+l_{3a})<0$ constrains the linkage lengths to prevent singularity in the four-bar mechanism ($J_1$, $J_2$, $J_3$, $J_4$). We use a similar constraint for the other four-bar mechanisms.

2) Radius Mechanism Optimization: Once the humerus parameters has been optimized, we can then optimize the remaining 17 parameters for the radius mechanism $$q_R=[l_6,l_7,l_{8a},l_{8b},l_{8c},l_9,l_{10a},l_{10b},l_{10c},l_{10}d,l_{11},l_{12a},l_{12b},p_{12y},p_{14x},p_{14y},\Delta\phi], \tag{6}$$

subject to similar constraints and follow the same procedures as the humerus optimization problem. The cost function calculates the trajectory error $y=\hat{\theta}e-\theta e$.

Optimization Results and Discussion

Figure 5A:
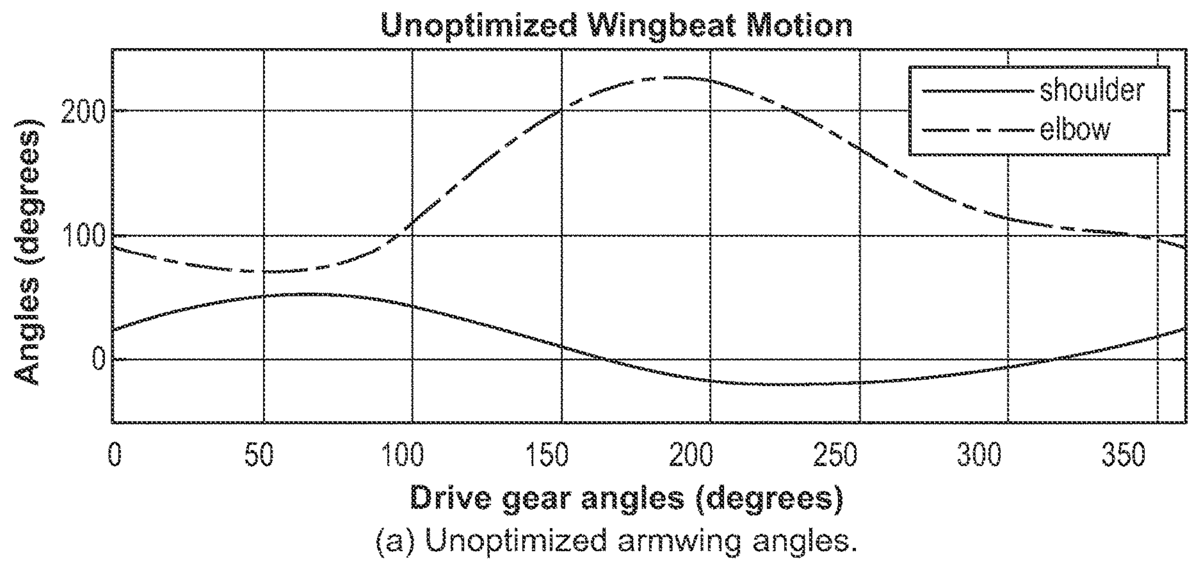
FIGS. 5A and 5B are charts showing unoptimized and optimized armwing shoulder and elbow angles, respectively, within a single wingbeat of the exemplary wing linkage mechanism in accordance with one or more embodiments.
Figure 5B:
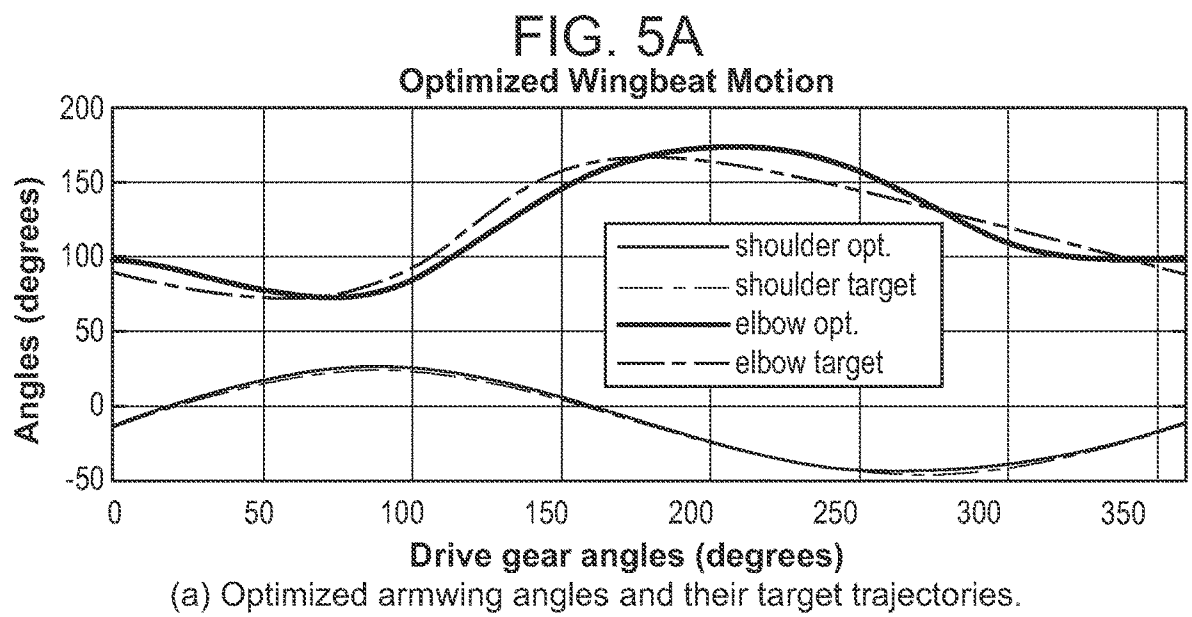

FIGS. 5A and 5B show the simulation of the shoulder and elbow angles for one flapping cycle using the rigid body kinematic formulation shown in (2). The unoptimized design trajectories, shown in FIG. 5A as a range of $\theta s \in [-20°, 54°]$ and $\theta e \in [70°, 228°]$, which have the characteristics of the ideal flapping motion that is discussed in Section III-B. However, the maximum elbow angle of 228° raises some concerns since that indicates a nontrivial joint hyperextension which might have an adverse effect on the armwing structure.

The design optimization has successfully found the design parameters q shown in Table II, which have 15.8% average difference compared to the initial values and closely follow the target trajectories as shown in FIG. 5B, with R2 values of 0.997 and 0.920 for θs and θe respectively which indicate a good fit. The optimized trajectory has motion range of $\theta s \in [-43°, 27°]$ and elbow angle range of $\theta e, \in [74°, 174°]$, which does not have the joint hyperextension present in the unoptimized design. The elbow joint and wingtip trajectories of the optimized design can be seen in FIG. 7. There should be no extreme hinge bending angles compared to its resting position to avoid breakage. Joints $J_8$, $J_{16}$, and $J_{17}$, which are all connected to the radius link $L_{12}$ have a maximum bending angles of 80° to 90° that bend significantly more towards one side than the other. Joint 11 has a maximum bending angle of 65° while the other joints have the maximum bending angle of less than 45°.

Structural And Sensitivity Analysis

The following discusses the structural and sensitivity analysis done on the optimized armwing structure. The structural analysis was done by using Solidworks Simulation FEA to simulate the flexible material bending as the armwing is articulated. Then a sensitivity analysis was done to show which design parameters have the most impact to the flapping gait and how the trajectories change with these parameters.

Figure 6A:
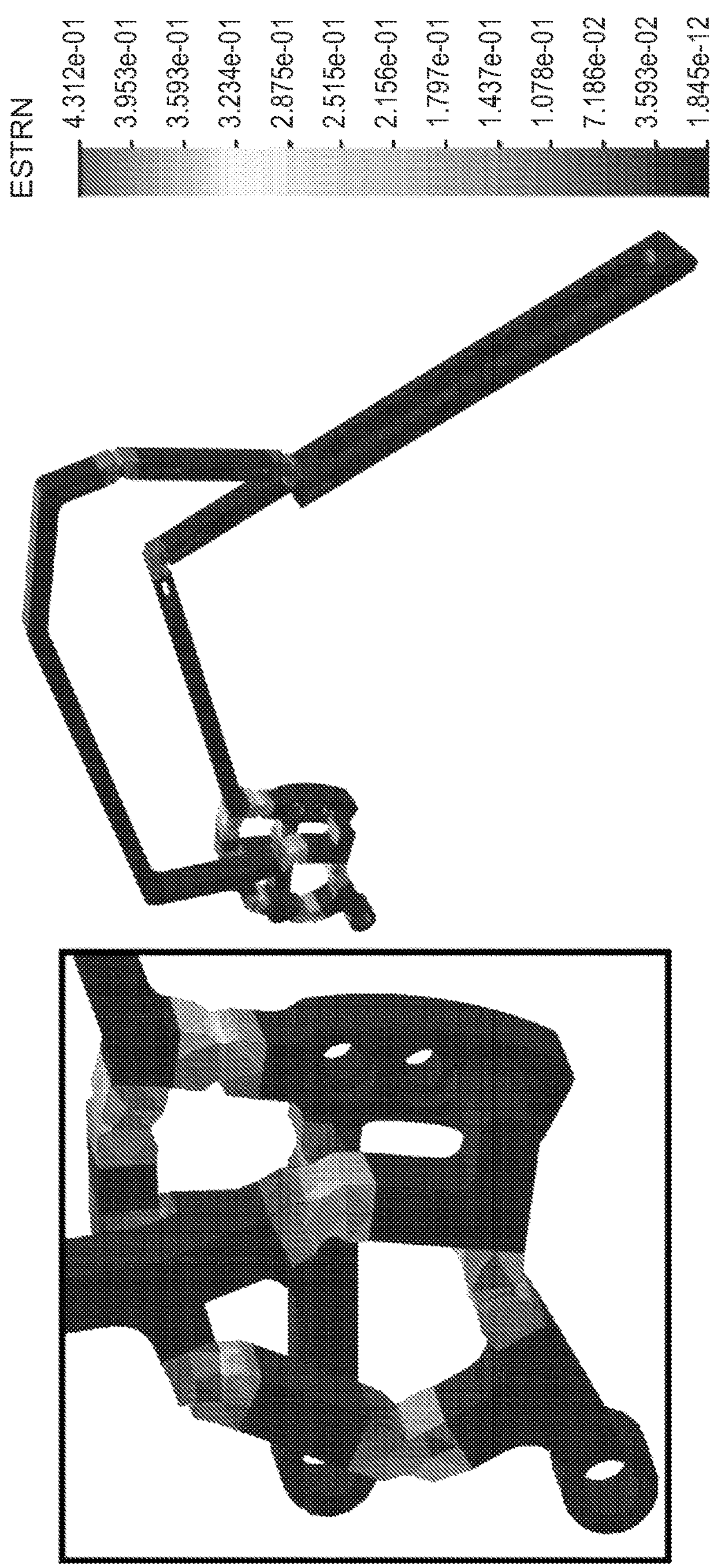

FIGS. 6A and 6B show the strain of the armwing structure during some of the key moments, which is simulated using the Solidworks Simulation FEA under static torques acting on the crank arms. We use the material property of FLX9870 (Table I), which has the density of 1.15 g/cm3 and average tensile strength of 5 MPa [34]. The simulation is done with the hyperelastic Mooney-Rivlin model using the material constants of a rubber shown in [37], with a Poisson's ratio of 0.4999, and first and second material constants of 0.3339 MPa and −0.337 kPa respectively. The key moments we considered are the beginning of the downstroke and upstroke motion where the mechanism starts to change its direction. As shown in FIGS. 6A-6B, the maximum strain during these two motions are 43% and 30% respectively. Since FLX9870 has an elongation at break of 120-140%, we have an adequate margin to deal with unforeseen strains, which might arise due to unexpected torsional and off-plane perturbations. A different hinge design can be considered to further reduce the stress/strain concentration, but our space constraints significantly limit our design options.

The sensitivity analysis is done to determine how much the parameters in q affect the θs and θe trajectories. Let A and M be the peak-to-peak amplitude and mean of the joint trajectories respectively, and Δθ be the phase difference between the peaks of θs and θe. The rate of change of Ae, As, Me, Me, and Δθ are evaluated about the optimized parameters q listed in Table II.

Table III (FIG. 11) shows the Jacobian of the A, M, and Δθ vs $q_H$ and $q_R$. The parameters have the following units: mm for lengths and positions, and rad for the angles. The most sensitive parameter is $l_1$ which affects the amplitudes As and Ae the most, and also significantly affects Δθ as well. The shoulder mean trajectory Ms are mostly affected by $l_4$, $l_{3a}$, $l_3b$, $l_2$, and $p_{7x}$. The elbow trajectory is mostly affected by the parameters $l_6$ and $l_7$. The angle parameters as significantly affects Ms, Me, and Ae while Lϕ affects Ae, but they have a different unit than the length parameters so it is difficult to directly compare their effects. In conclusion, the length parameters of the links closer to the driving gears are among the most sensitive parameters in our mechanism.

Figure 7A:
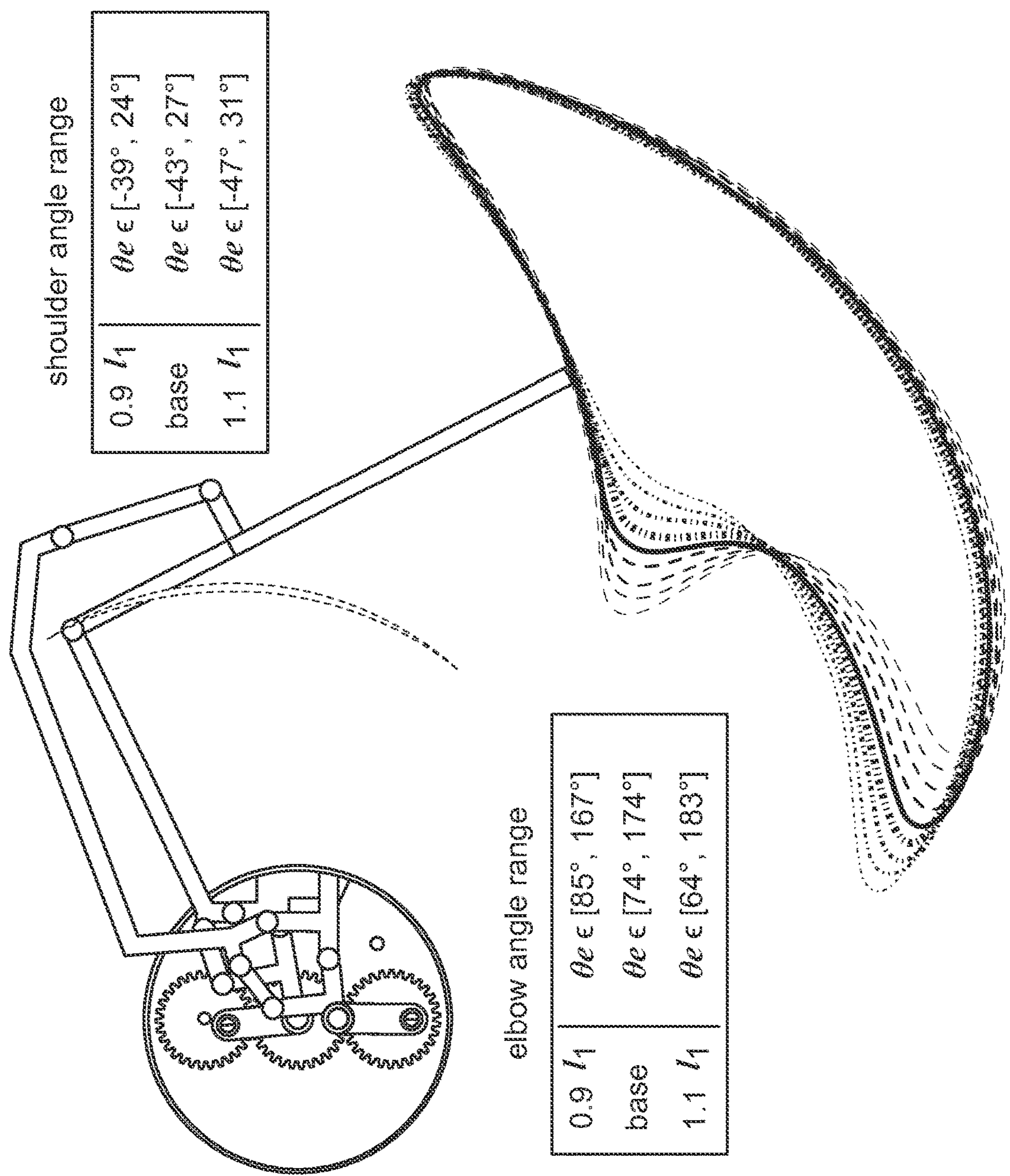
FIGS. 7A, 7B, and 7C illustrate armwing elbow joint and wingtip trajectories generated by varying one of the design parameters.
Figure 7B:
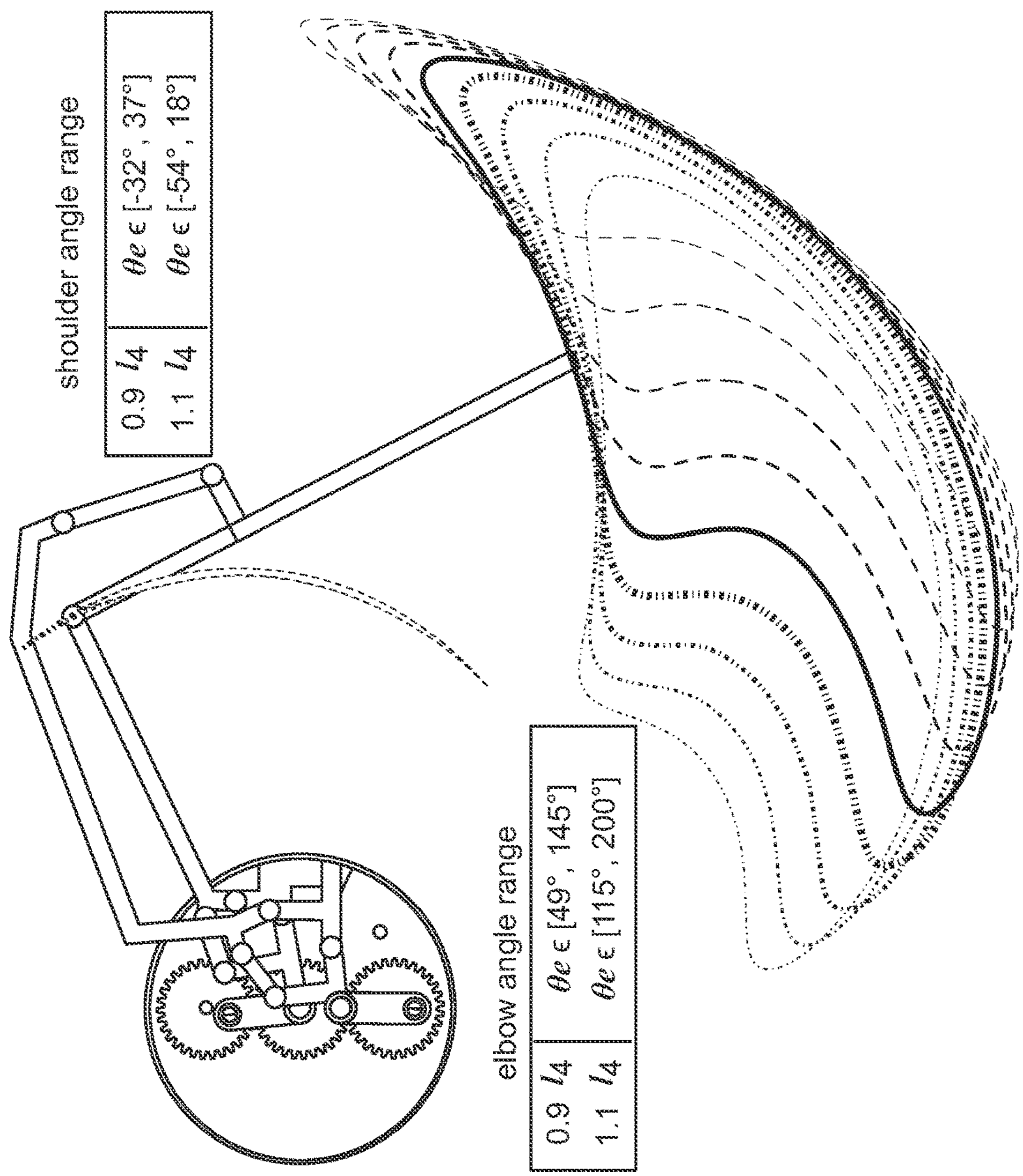
Figure 7C:
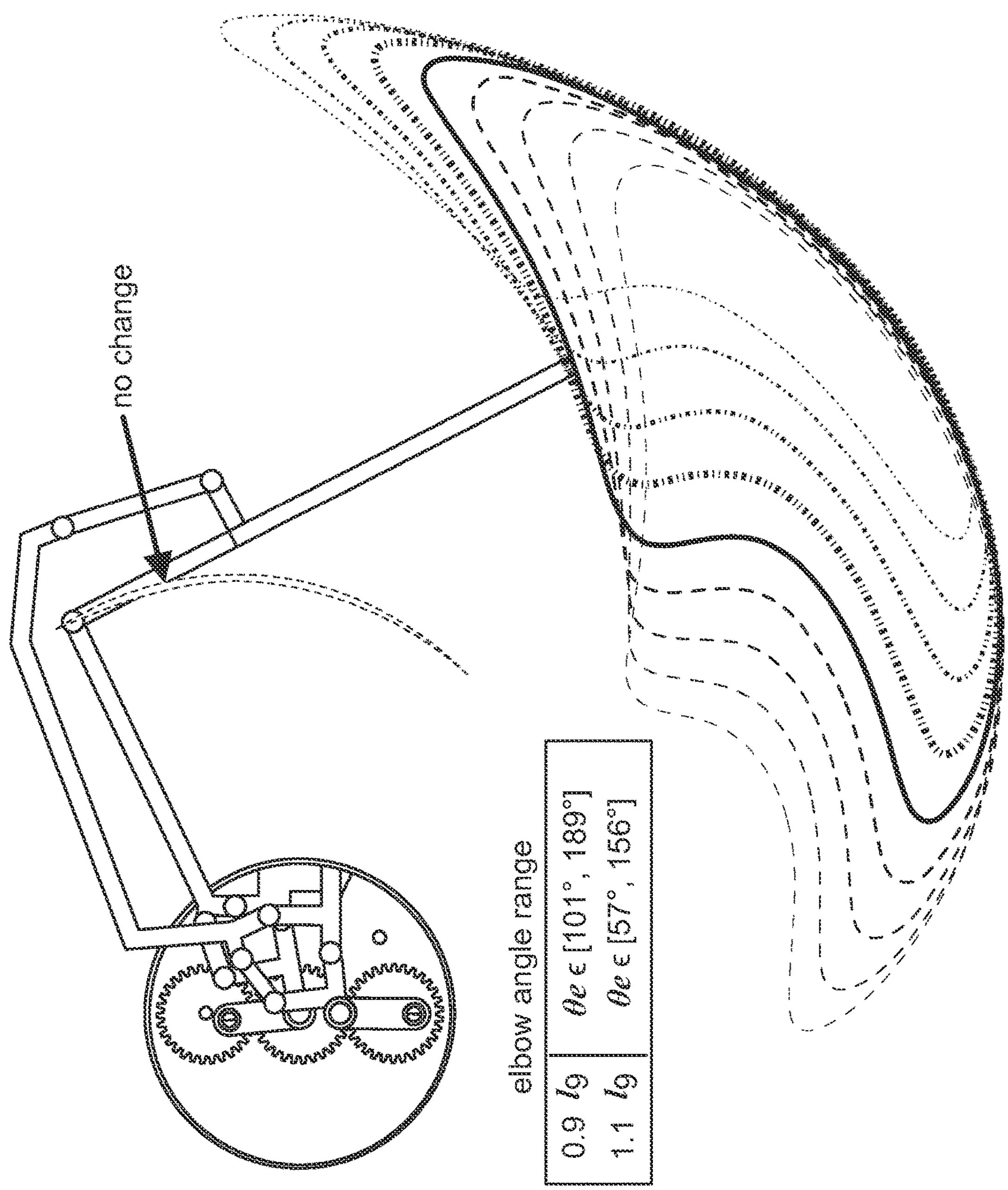

FIGS. 7A, 7B, and 7C show how the elbow joint and wingtip trajectory varies with some of the design parameters, particularly $l_1$, $l_4$, and $l_9$. $l_1$ is chosen as it is the most sensitive parameter in the design while $l_4$ and $l_9$ are simple links that are relatively sensitive to change in the shoulder and elbow joint angle trajectories. $l_4$ and $l_9$ are also chosen to promote our control framework where we adjust the flapping gait by changing the wing conformation. These links are simple straight links and we might be able change the design to support variable length linkages on these links. The mechanism design and implementation of this idea can be a part of our future work. The values tested in FIGS. 7A-7C are adjusted by ±2.5%, up to ±10% from their original values in Table II. The green and red lines represent an increase and decrease compared to the original parameter value respectively. As shown in FIG. 7C, the elbow joint trajectory is unaffected by a change in $l_9$, which is also shown in Table III. This indicates that we can adjust θe independently from θs, which supports our idea of applying control through morphology manipulation.

For reference, videos depicting exemplary robot wing motion can be viewed at https://www.youtube.com/watch?v=X_UhhCvFC_Q and https://www.youtube.com/watch?v=9nWx4rhUtm0.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

REFERENCES

[1] J. Everaerts et al., "The use of unmanned aerial vehicles (UAVs) for remote sensing and mapping," Int. Arch. Photogrammetry, Remote Sens. Spatial Inf. Sci., vol. 37, no. 2008, pp. 1187-1192, 2008.

[2] I. Pavlidis, V. Morellas, P. Tsiamyrtzis, and S. Harp, "Urban surveillance systems: From the laboratory to the commercial world," Proc. IEEE, vol. 89, no. 10, pp. 1478-1497, October 2001.

[3] B. W. Tobalske, "Biomechanics and physiology of gait selection in flying birds," Physio Biochem. Zoology, vol. 73, no. 6, pp. 736-750, 2000.

[4] D. K. Riskin, A. Bergou, K. S. Breuer, and S. M. Swartz, "Upstroke wing flexion and the inertial cost of bat flight," Proc. Roy. Soc. B: Biol. Sci., vol. 279, no. 1740, pp. 2945-2950, 2012.

[5] T. J. Roberts and N. Konow, "How tendons buffer energy dissipation by muscle," Exercise Sport Sci. Rev., vol. 41, no. 4, pp. 186-193, 2013.

[6] H. Tanaka, H. Okada, Y. Shimasue, and H. Liu, "Flexible flapping wings with self-organized microwrinkles," Bioinspiration Biomimetics, vol. 10, no. 4, 2015, Art. no. 046005.

[7] D. K. Riskin et al., "Quantifying the complexity of bat wing kinematics," J. Theor. Biol., vol. 254, no. 3, pp. 604-615, 2008.

[8] A. Azuma, "The biokinetics of flying and swimming," Amer. Inst. Aeronaut. Astronaut., 2006.

[9] E. Chang, L. Y. Matloff, A. K. Stowers, and D. Lentink, "Soft biohybrid morphing wings with feathers underactuated by wrist and finger motion," Sci. Robot., vol. 5, no. 38, 2020, Art. no. eaay1246.

[10] D. D. Chin, L. Y. Matloff, A. K. Stowers, E. R. Tucci, and D. Lentink, "Inspiration for wing design: How forelimb specialization enables active flight in modern vertebrates," J. Roy. Soc. Interface, vol. 14, no. 131, 2017, Art. no. 20170240.

[11] S. Tang and V. Kumar, "Autonomous flight," Annu. Rev. Control, Robot., Auton. Syst., vol. 1, pp. 29-52, 2018.

[12] E. Farrell Helbling and R. J. Wood, "A review of propulsion, power, and control architectures for insect-scale flapping-wing vehicles," Appl. Mech. Rev., vol. 70, no. 1, 2018, Art. no. 010801.

[13] M. Di Luca, S. Mintchev, Y. Su, E. Shaw, and K. Breuer, "A bioinspired separated flow wing provides turbulence resilience and aerodynamic efficiency for miniature drones," Sci. Robot., vol. 5, no. 38, 2020, Art. no. eaay8533.

[14] M. Karasek, F. T. Muijres, C. De Wagter, B. D. Remes, and G. C. de Croon, "A tailless aerial robotic flapper reveals that flies use torque coupling in rapid banked turns," Science, vol. 361, no. 6407, pp. 1089-1094, 2018.

[15] L. J. Roberts, H. A. Bruck, and S. Gupta, "Modeling of dive maneuvers for executing autonomous dives with a flapping wing air vehicle," J. Mechanisms Robot., vol. 9, no. 6, 2017, Art. no. 061010.

[16] A. E. Holness, H. Solheim, H. A. Bruck, and S. K. Gupta, "A design framework for realizing multifunctional wings for flapping wing air vehicles using solar cells," Int. J. Micro Air Veh., vol. 11, p. 19, 2019, doi: 10.1177/1756829319836279.

[17] R. Madangopal, Z. A. Khan, and S. K. Agrawal, "Biologically inspired design of small flapping wing air vehicles using four-bar mechanisms and quasi-steady aerodynamics," J. Mech. Des., vol. 127, no. 4, pp. 809-816, 2005.

[18] W. Yang, L. Wang, and B. Song, "Dove: A biomimetic flapping-wing micro air vehicle," Int. J. Micro Air Veh., vol. 10, no. 1, pp. 70-84, 2018.

[19] S. P. Sane and M. H. Dickinson, "The control of flight force by a flapping wing: Lift and drag production," J. Exp. Biol., vol. 204, no. 15, pp. 2607-2626, 2001.

[20] W. Send, M. Fischer, K. Jebens, R. Mugrauer, A. Nagarathinam, and F. Scharstein, "Artificial hinged-wing bird with active torsion and partially linear kinematics," in Proc. 28th Congr. Int. Council Aeronautical Sci., 2012, pp. 1148-1157.

[21] A. Ramezani, X. Shi, S. J. Chung, and S. Hutchinson, "Bat Bot (B2), a biologically inspired flying machine," in Proc. Int. Conf. Robot. Aut., 2016, pp. 3219-3226.

[22] J. Hoff, A. Ramezani, S. J. Chung, and S. Hutchinson, "Synergistic design of a bio-inspired micro aerial vehicle with articulated wings," in Proc. Robot.: Sci. Syst., 2016, p. 9, doi: 10.15607/RSS.2016.XII.009.

[23] J. Hoff, A. Ramezani, S. J. Chung, and S. Hutchinson, "Optimizing the structure and movement of a robotic bat with biological kinematic synergies," Int. J. Robot. Res., vol. 37, no. 10, pp. 1233-1252, 2018.

[24] J. Hoff, A. Ramezani, S. J. Chung, and S. Hutchinson, "Reducing versatile bat wing conformations to a 1-machine," in Proc. Conf. Biomimetic Biohybrid Syst., 2017, pp. 181-192.

[25] A. Ramezani, S. U. Ahmed, J. Hoff, S. J. Chung, and S. Hutchinson, "Describing robotic bat flight with stable periodic orbits," in Proc. Conf. Biomimetic Biohybrid Syst., 2017, pp. 394-405.

[26] A. Ramezani, X. Shi, S. J. Chung, and S. Hutchinson, "Lagrangian modeling and flight control of articulated-winged bat robot," in Proc. Int. Conf. Intell. Robots Syst., 2015, pp. 2867-2874.

[27] A. Ramezani, X. Shi, S. J. Chung, and S. A. Hutchinson, "Modeling and nonlinear flight controller synthesis of a bat-inspired micro aerial vehicle," in Proc. Guid., Navigation, Control Conf., 2016, Art. no. 1376, doi: 10.2514/6.2016-1376.

[28] J. Hoff, U. Syed, A. Ramezani, and S. Hutchinson, "Trajectory planning for a bat-like flapping wing robot," in Proc. Int. Conf. Intell. Robots Syst., 2019, pp. 6800-6805.

[29] U. A. Syed, A. Ramezani, S. J. Chung, and S. Hutchinson, "From rousettus *aegyptiacus* (bat) landing to robotic landing: Regulation of CG-CP distance using a nonlinear closed-loop feedback," in Proc. Int. Conf. Robot. Autom., 2017, pp. 3560-3567.

[30] J. W. Bahlman, S. M. Swartz, and K. S. Breuer, "Design and characterization of a multi-articulated robotic bat wing," Bioinspiration Biomimetics, vol. 8, no. 1, 2013, Art. no. 016009.

[31] J. Colorado, A. Barrientos, C. Rossi, and K. S. Breuer, "Biomechanics of smart wings in a bat robot: Morphing wings using SMA actuators," Bioinspiration Biomimetics, vol. 7, no. 3, 2012, Art. no. 036006.

[32] H. Hauser, A. J. Ijspeert, R. M. Fuchslin, R. Pfeifer, and W. Maass, "The role of feedback in morphological computation with compliant bodies," Biol. Cybern., vol. 106, no. 10, pp. 595-613, 2012.

[33] B. P. Trease, Y.-M. Moon, and S. Kota, "Design of large-displacement compliant joints," Trans. ASME, vol. 127, pp. 788-798, 2005.

[34] "Digital materials data sheet," 2017. [Online]. Available: https://www.stratasys.com/-/media/files/material-spec-sheets/mss_pj_digitalmaterialsdatasheet_0617a.pdf, Accessed on: May 2020.

[35] U. M. Norberg, "Functional osteology and myology of the wing of the dog-faced bat *rousettus aegyptiacus* (E. Geoffroy) (mammalia, Chi-roptera)," Zeitschrift Für Morphologie der Tiere, vol. 73, no. 1, pp. 1-44, 1972.

[36] D. E. Vogtmann, S. K. Gupta, and S. Bergbreiter, "Characterization and modeling of elastomeric joints in miniature compliant mechanisms," J. Mechanisms Robot., vol. 5, no. 4, 2013, Art. no. 041017.

[37] M. Shahzad, A. Kamran, M. Z. Siddiqui, and M. Farhan, "Mechanical characterization and FE modelling of a hyperelastic material," Mater. Res., vol. 18, no. 5, pp. 918-924, 2015.

[38] N. A. Meisel, A. M. Elliott, and C. B. Williams, "A procedure for creating actuated joints via embedding shape memory alloys in Polyjet 3D printing," J. Intell. Mater. Syst. Struct., vol. 26, no. 12, pp. 1498-1512, 2015.

The invention claimed is:

1. Robotic wings for an aerial drone, comprising:

a plurality of armwing structures, each comprising a plurality of rigid members connected together by flexible living hinges in a single monolithic structure;

wing membranes supported by the armwing structures;

a drive mechanism connected to the armwing structures for articulating the armwing structures;

each armwing structure including an upper section with a radius four-bar linkage mechanism connected to the drive mechanism and a lower section with a humerus four-bar linkage mechanism connected to the drive mechanism; and a motor connected to the drive mechanism for actuating the drive mechanism to move the armwing structures through a series of wingbeats wherein the armwing structures expand in a downstroke and retract in an upstroke to move the wing membranes in a flapping motion.

2. The robotic wings of claim 1, wherein the rigid members and flexible living hinges comprise different materials, and wherein the armwing structures are formed in an additive manufacturing process.

3. The robotic wings of claim 2, wherein the additive manufacturing process uses a Polyjet 3-D printer.

4. The robotic wings of claim 1, wherein the armwing structures include four-bar linkage mechanisms.

5. The robotic wings of claim 1, wherein each flexible living hinge comprises a joint with a notch design.

6. The robotic wings of claim 1, wherein the drive mechanism comprises a gear and crank mechanism operably coupled to the motor and to the plurality of armwing structures.

7. The robotic wings of claim 1, wherein the armwing structures comprise two sets of crank and four-bar mechanisms representing a radius bone and a humerus bone, respectively, in a bat's arm.

8. The robotic wings of claim 7, wherein the two sets of crank and four-bar mechanisms are off-plane and parallel to each other.

9. The robotic wings of claim 8, wherein gears of the drive mechanism that drive the two sets of crank and four-bar mechanisms are located in a midpoint of housing to enable a symmetric wing assembly.

10. The robotic wings of claim 1, wherein the motor comprises a single brushless motor.

11. The robotic wings of claim 1, wherein the aerial robot drone comprises a micro-aerial vehicle.

12. The robotic wings of claim 1, wherein the wing membranes each comprise a flexible printed circuit board.

13. The robotic wings of claim 12, wherein the printed circuit board includes computer processing units and sensors.

14. The robotic wings of claim 13, wherein the sensors perform flow measurement or wing movement measurement.

15. Armwing structures for an aerial robot, each comprising a plurality of rigid members connected together by flexible living hinges in a single monolithic structure, each armwing structure supporting a wing membrane and articulated by a drive mechanism driven by a motor; and each armwing structure including an upper section with a radius four-bar linkage mechanism connected to the drive mechanism and a lower section with a humerus four-bar linkage mechanism connected to the drive mechanism, such that the armwing structures are moved through a series of wingbeats during which the armwing structures expand in a downstroke and retract in an upstroke to move the wing membranes in a flapping motion.

16. The armwing structures of claim 15, wherein the rigid members and flexible living hinges comprise different materials, and wherein the armwing structures are formed in an additive manufacturing process.

17. The armwing structures of claim 15, wherein the armwing structures include four-bar linkage mechanisms.

18. The armwing structures of claim 15, wherein the armwing structures comprise two sets of crank and four-bar mechanisms representing a radius bone and a humerus bone, respectively, in a bat's arm.

* * * * *

UNITED STATES PATENT AND TRADEMARK OFFICE
CERTIFICATE OF CORRECTION

| | | |
|---|---|---|
| PATENT NO. | : 12,404,021 B2 | Page 1 of 1 |
| APPLICATION NO. | : 17/786273 | |
| DATED | : September 2, 2025 | |
| INVENTOR(S) | : Alireza Ramezani | |

It is certified that error appears in the above-identified patent and that said Letters Patent is hereby corrected as shown below:

In the Claims

In Claim 11, at Column 14, Line number 10:
"11. The robotic wings of claim 1, wherein the aerial robot drone comprises a micro-aerial vehicle."

Should read:
--11. The robotic wings of claim 1, wherein the aerial drone comprises a micro-aerial vehicle.--

Signed and Sealed this
Eighteenth Day of November, 2025

John A. Squires
*Director of the United States Patent and Trademark Office*